United States Patent
Gooding et al.

(10) Patent No.: US 10,289,329 B2
(45) Date of Patent: May 14, 2019

(54) BURST BUFFER DYNAMIC LOGICAL VOLUME SIZING IN HIGH PERFORMANCE COMPUTING ENVIRONMENT

(71) Applicant: International Business Machines Corporation, Armonk, NY (US)

(72) Inventors: Thomas M. Gooding, Rochester, MN (US); David L. Hermsmeier, Oronoco, MN (US); Jin Ma, Ontario (CA); Gary J. Mincher, Poughkeepsie, NY (US); Bryan S. Rosenburg, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 131 days.

(21) Appl. No.: 15/433,998

(22) Filed: Feb. 15, 2017

(65) Prior Publication Data
US 2018/0232143 A1    Aug. 16, 2018

(51) Int. Cl.
*G06F 13/00* (2006.01)
*G06F 3/06* (2006.01)
*G06F 11/14* (2006.01)
*H04L 29/08* (2006.01)

(52) U.S. Cl.
CPC .......... *G06F 3/0631* (2013.01); *G06F 3/0605* (2013.01); *G06F 3/067* (2013.01); *G06F 11/1407* (2013.01); *H04L 67/1097* (2013.01)

(58) Field of Classification Search
CPC . G06F 3/06; G06F 3/061; G06F 3/063; G06F 3/067; G06F 15/167; G06F 3/64; G06F 3/12
See application file for complete search history.

(56) References Cited

U.S. PATENT DOCUMENTS

| | | | |
|---|---|---|---|
| 9,158,540 B1 | 10/2015 | Tzelnic et al. | |
| 9,286,261 B1 | 3/2016 | Tzelnic et al. | |
| 9,465,549 B1 | 10/2016 | Faibish et al. | |
| 2014/0337557 A1* | 11/2014 | Nowoczynski | G06F 13/28 710/308 |

OTHER PUBLICATIONS

Henseler, Dave, et al. "Architecture and Design of Cray DataWarp," 11 pages.
Thapaliya, Sagar, et al., "Managing I/O Interference in a Shared Burst Buffer System," 2016 45th International Conference on Parallel Processing (ICPP), pp. 416-425, IEEE.
Sato, Kento, et al. "Burst SSD Buffer: Checkpoint Strategy at Extreme Scale." Burst SSD Buffer: Checkpoint Strategy at Extreme Scale; IPSJ SIG Technical Report; vol. 2013-HPC-141, No. 19, Oct. 1, 2013.
Wang, Teng, et al. "BurstFS: A Distributed Burst Buffer File System for Scientific Applications." The International Conference for High Performance Computing, Networking, Storage and Analysis (SC). 2015.
Nersc, "Burst Buffer Architecture and Software Roadmap," http://www.nersc.gov.users/computational-systems/cori/burst-buffer/burst-buffer/.
Slurm Workload Manager, "Slurm Burst Buffer Guide," https://slurm.schedmd.com/burst_buffer.html, Nov. 10, 2016.

* cited by examiner

*Primary Examiner* — Charles Rones
*Assistant Examiner* — Han V Doan
(74) *Attorney, Agent, or Firm* — Middleton Reutlinger (57) ABSTRACT

A method, data processing system and program product utilize dynamic logical storage volume sizing for burst buffers or other local storage for computing nodes to optimize job stage in, execution and/or stage out.

19 Claims, 7 Drawing Sheets

BURST BUFFER DYNAMIC LOGICAL VOLUME SIZING IN HIGH PERFORMANCE COMPUTING ENVIRONMENT

STATEMENT REGARDING FEDERALLY SPONSORED RESEARCH

The invention disclosed herein was made with U.S. Government support under Contract No. B604142 awarded by the U.S. Department of Energy. The Government has certain rights in this invention.

BACKGROUND

Computing technology has advanced at a remarkable pace, with each subsequent generation of computing system increasing in performance, functionality, and storage capacity, often at reduced cost. However, despite these advances, many scientific and business applications still demand massive computing power, which can only be met by extremely high performance computing (HPC) systems. One particular type of computing system architecture that is often used in high performance applications is a parallel processing computing system.

Generally, a parallel processing computing system comprises a plurality of physical computing nodes and is configured with an HPC application environment, e.g., including a runtime environment that supports the execution of a parallel application across multiple physical computing nodes. Some parallel processing computing systems, which may also be referred to as massively parallel processing computing systems, may have hundreds or thousands of individual physical computing nodes, and provide supercomputer class performance. Each physical computing node is typically of relatively modest computing power and generally includes one or more processors and a set of dedicated memory devices, and is configured with an operating system instance (OSI), as well as components defining a software stack for the runtime environment. To execute a parallel application, a cluster is generally created consisting of physical computing nodes, and one or more parallel jobs or tasks are executed within an OSI in each physical computing node and using the runtime environment such that jobs or tasks may be executed in parallel across all physical computing nodes in the cluster.

Performance in parallel processing computing systems can be dependent upon the communication costs associated with communicating data between the components in such systems. Accessing a memory directly coupled to a processor in one physical computing node, for example, may be several orders of magnitude faster than accessing a memory on different physical computing node, or accessing a larger network attached storage. In addition, retaining the data within a processor and/or directly coupled memory when a processor switches between different jobs or tasks can avoid having to reload the data. Accordingly, organizing the jobs or tasks executed in a parallel processing computing system to localize operations and data and minimize the latency associated with communicating data between components can have an appreciable impact on performance.

Some parallel processing computing systems have attempted to reduce the communication costs of accessing data from network attached storage by utilizing a burst buffer data tier between the network attached storage and the computing nodes and consisting of a smaller but faster non-volatile storage, e.g., solid state drive (SSD)-based storage. Burst buffers may be used, for example, to stage in input data to be used by a task or job prior to execution of the task or job and then stage out output data generated by the task or job once execution is complete. In addition, burst buffers may be used to assist with overlapping tasks or jobs such that while data is being staged for some jobs or tasks, other jobs or tasks that have already been staged can execute using the previously-staged data, in many instances allowing for the apparent input/output (I/O) performance to be more equivalent to SSD speeds, rather than network storage speeds. Burst buffers, however, are generally limited in storage capacity, and as a result, some jobs or tasks may be unable to be staged until other jobs or tasks are completed and staged out, thereby limiting the ability to overlap jobs or tasks due to burst buffer capacity constraints.

SUMMARY

According to an embodiment of the present invention, a job may be executed in a data processing system by, for each of a plurality of computing nodes in the data processing system, allocating a logical storage volume for the job in such computing node; after allocating the logical storage volume in each computing node, prestaging input data for the job in the logical storage volume in each computing node; after prestaging the input data for the job in the logical storage volume in each computing node, increasing an allocation size of the logical storage volume in each computing node; and after increasing the allocation size of the logical storage volume in each computing node, executing the job on each computing node such that the job executes with the increased allocation size of the logical storage volume in each computing node.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
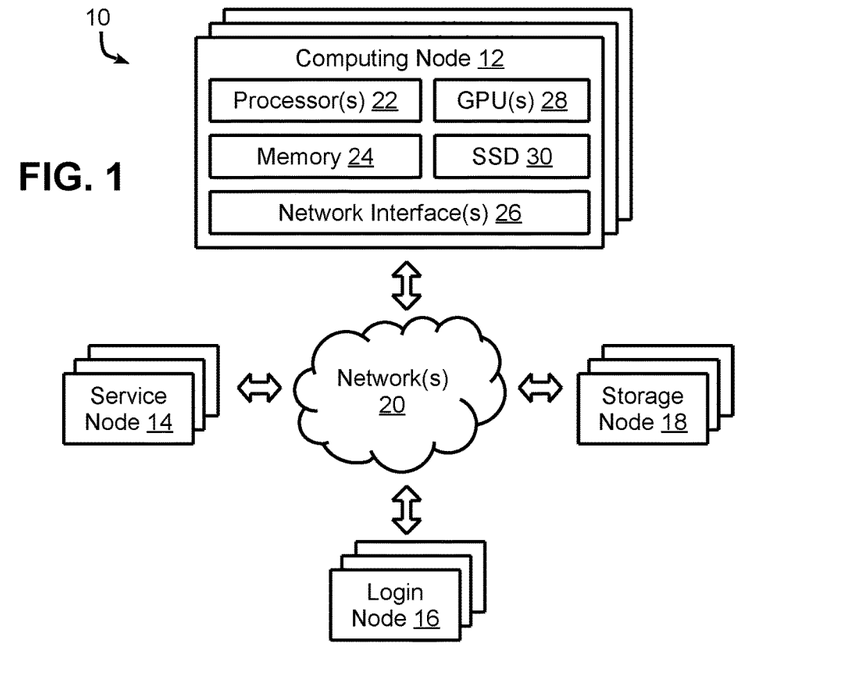
FIG. 1 is a block diagram of an example hardware environment for a high performance computing environment consistent with the invention.
Figure 2:
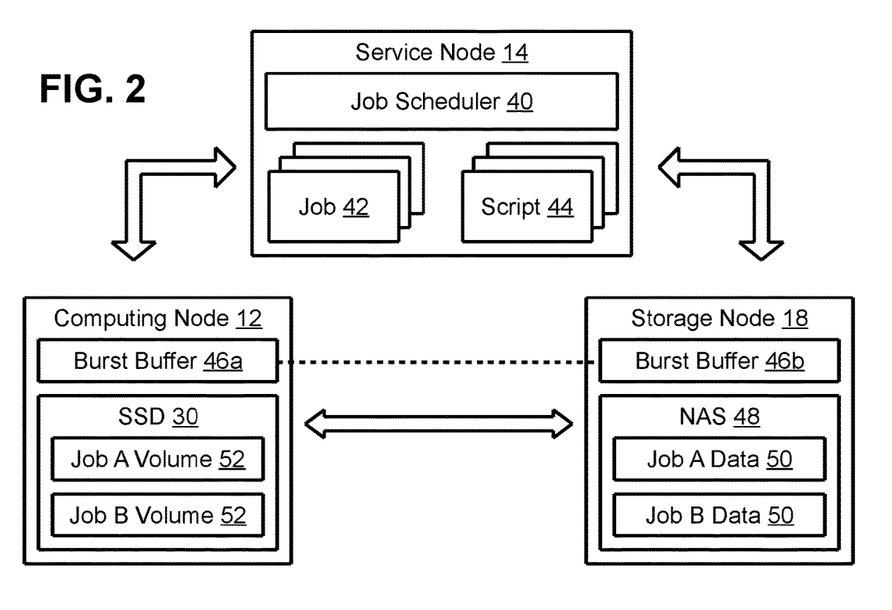
FIG. 2 is a block diagram illustrating example data flow in the high performance computing environment of FIG. 1.

Referring now to the Drawings, wherein like numbers denote like parts throughout the several views, FIGS. 1-2 illustrate the principal hardware and software components in a data processing system or apparatus 100 consistent with the invention, and suitable for implementation of burst buffer dynamic logical volume sizing in various high performance computing (HPC) and/or parallel processing computing environments. As shown in FIG. 1, data processing system 10 may include a multi-node architecture where the physical hardware is distributed among a plurality of physical nodes, including, for example, computing nodes 12, service nodes 14, login nodes 16 and storage nodes 18, and coupled to one another via one or more networks 20.

Each node 12-18 may be implemented in a separate host or computer system in some embodiments, while in other embodiments multiple nodes may reside in the same hosts or computer systems. Computing nodes 12 are used to handle the primary processing workload of data processing system 10, while service nodes 14 are generally used to manage the overall operation of the data processing system, including among other functions the scheduling of jobs or tasks on groups of computing nodes 12. Login nodes 16 are accessible by end users principally for the purposes of creating jobs and retrieving the results of such jobs. Storage nodes 18 provide network attached storage representing the primary mass storage system for the data processing system.

Nodes 12-18 may be interconnected with one another via one or more networks 20, which may include, for example, Infiniband or other high bandwidth networks, as well as additional supplemental or sideband networks, e.g., Ethernet networks for the purpose of command and control and inter-node management communications, networks to external systems, etc.

It will be appreciated that data processing system 10 is merely one example of an architecture suitable for hosting an HPC environment, and that a wide variety of other architectures may be used to host an HPC environment. Further, the principles disclosed herein may also be used in various other environments utilizing parallel processing supported by multiple computing nodes, so it will be appreciated that a data processing system in some embodiments may be implemented using various desktop computers, supercomputers, servers, laptop computers, tablets, mobile devices, and other programmable electronic devices, etc.

Each computing node 12 may be considered to include one or more processors 22, each of which may be implemented as a single or multi-threaded processor and/or as a single or multi-core processor, as well as a memory 24, which may be considered to include one or more levels of memory devices, e.g., a DRAM-based main storage, as well as one or more levels of data, instruction and/or combination caches, with certain caches either serving individual processors or multiple processors as is well known in the art. In the illustrated embodiment, for example, memory 24 may include a volatile memory. In addition, the memory of data processing system 10 may be considered to include memory storage physically located elsewhere in data processing system 10, e.g., any cache memory in a processor, as well as any storage capacity used as a virtual memory, e.g., as stored on a mass storage device or on another computer coupled to data processing system 10.

In addition, in the illustrated embodiment, each computing node may include additional hardware components, e.g., one or more network interfaces 26 interfacing the computing node to one or more of networks 20, various hardware accelerators, e.g., graphics processing units (GPUs) 28, as well as non-volatile storage, e.g., one or more solid state drives (SSD's) 30. It will be appreciated that alternative non-volatile storage devices may be used in other embodiments, and that in some embodiments, no non-volatile storage may be provided within a computing node. Further, in some embodiments, other hardware accelerators may be used in each computing node, while in other embodiments, no hardware accelerators may be used.

It will also be appreciated that each service node 14, login node 16, and storage node 18 may include at least one or more processors and a memory, and may be similarly configured to a computing node 12 or differently configured therefrom. A storage node 18, for example, may additionally include non-volatile storage and/or an interface to external non-volatile storage, e.g., as may be provided by a storage area network (SAN).

Data processing system 10 operates under the control of one or more kernels, hypervisors, operating systems, etc., and executes or otherwise relies upon various computer software applications, components, programs, objects, modules, data structures, etc., as will be described in greater detail below. Moreover, various applications, components, programs, objects, modules, etc. may also execute on one or more processors in another computer coupled to data processing system 10 via network, e.g., in a distributed or client-server computing environment, whereby the processing required to implement the functions of a computer program may be allocated to multiple computers over a network.

For example, FIG. 2 illustrates various software components or entities that may be utilized in connection with implementing burst buffer dynamic logical volume sizing in data processing system 10. A service node 14, for example, may host a job scheduler 40, also referred to herein as a workload manager, which may be used to schedule the stage in, stage out and execution of jobs 42 in data processing system 10. As will be appreciated from the discussion below, in some embodiments job scheduler 40 may utilize one or more scripts 44 in connection with staging in, staging out and executing jobs 42.

Further, in the illustrated embodiment, data processing system 10 implements a burst buffer data tier utilizing cooperative burst buffer components 46a, 46b resident in each of computing nodes 12 and storage nodes 18. Burst buffers generally provide an intermediate set of fast non-volatile or persistent storage between, on the one hand, processors and their associated high speed volatile memory (e.g., DRAM), and on the other hand, a comparatively slower but substantially larger and more permanent mass storage. In many embodiments, burst buffers rely on flash memory or solid stage drives to provide the non-volatile storage, although other non-volatile memory technologies may also be used. In some embodiments, burst buffers may be physically separate from computing and storage nodes, e.g., provided as network attached appliances and/or may be shared by multiple computing nodes and/or processors. In other embodiments, however, burst buffers may include dedicated non-volatile storage for each computing node and/or processor. The embodiments discussed below, for example, utilize dedicated non-volatile storage, in the form of an SSD 30, for each computing node 12.

As noted above, cooperative burst buffer components 46a, 46b may be resident in each of a computing node 12 and a storage node 18, with components 46a, 46b interfaced with one another to communicate data between a slower mass storage system, e.g., a network attached storage device 48 and SSD 30, and generally in a manner that is similar to that of a cache memory to effectively enable data persistently stored in NAS 48 (e.g., example job data 50 illustrated in FIG. 2 for example jobs A and B) to be effectively accessed by a computing node 12 at the speed of an SSD 30. As will become more apparent below, the data may be maintained within an SSD 30 in the form of a logical storage volume 52 (e.g., example logical storage volumes illustrated in FIG. 2 for example jobs A and B), representing a logical storage device that is separately accessible by a computing node.

It will be appreciated that the present invention described herein may be a system, a method, and/or a computer program product. The computer program product may include a computer readable storage medium (or media) having computer readable program instructions thereon for causing one or more processors to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the drawings illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition, computer readable program instructions, of which one or more may collectively be referred to herein as "program code," may be identified herein based upon the application within which such instructions are implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the example environment illustrated in FIGS. 1 and 2 is not intended to limit the present invention. Indeed, those skilled in the art will recognize that other alternative hardware and/or software environments may be used without departing from the scope of the invention.

Burst Buffer Dynamic Logical Volume Sizing

In a data processing system such as a data processing system implementing an HPC environment, when a user wants to run a job or task on a cluster managed by a workload manager/job scheduler, the user generally provides a list of resources needed by the job. For example, such resources might be machine type, CPU/GPU architecture, amount of memory, amount of storage, amount of network bandwidth, and the number of computing nodes needed. However, when allocating storage, the amount of storage needed to run the job may not be immediately available, which may cause the job to remain pending in the job queue until the necessary storage is available.

For some I/O patterns in an HPC environment, extremely large (e.g., petabyte-scale) data sets are read at the beginning of the job. The job performs some work, then writes updated data to storage. As noted above, the burst buffer concept creates an ephemeral data tier between the permanent network-attached storage and the computing nodes, and that relies on smaller but faster non-volatile storage (e.g., one or more SSD's). To make efficient use of this additional data tier, it is generally desirable to stage input data into a burst buffer prior to job execution, and when the job is complete, to stage output data out of the burst buffer. Furthermore, while data is being staged for some jobs, other jobs that already have their data staged in to the burst buffer can generally execute on the computing nodes, generally allowing for apparent I/O performance to be substantially equivalent to SSD speeds, rather than network-attached storage speeds.

In some embodiments, as noted above, it may be desirable to implement a burst buffer solution by providing each computing node in a cluster of computing nodes with a local, dedicated SSD, which provides applications the benefit of a high performance SSD attached on a local bus (e.g., a PCIe bus) for low latency operations. However, it has been found that with such an architecture, several challenges exist. Shared burst buffer appliances, for example, can have aggregated storage exceeding several petabytes, so stage in/out of data for multiple jobs is generally not constrained by a lack of available storage. Where non-shared/dedicated local SSD's are used, however, the amount of available storage on each computing node is necessarily much lower (e.g., about 1.6 TB in some embodiments), so any unused storage from other computing nodes generally is unavailable for use by a computing node lacking sufficient available storage. As such, it has been found that in such implementations, efficient sharing of this constrained storage and integration with a job scheduler may be used to optimize burst buffer performance when handling the overall data demands for all jobs on a computing node.

In part, this optimization is enabled by the use of dynamic logical volume sizing to dynamically vary the size of a logical storage volume resident in a computing node during the staging in and/or staging out of data for a job to reduce the amount of allocated but unused storage and thereby increase the amount of allocated and used storage in the computing node.

Figure 3:
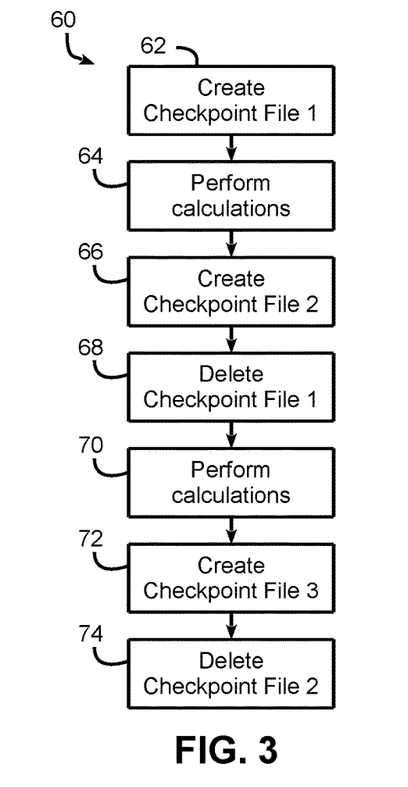
FIG. 3 is a flowchart illustrating an example sequence of operations for executing a job in the high performance computing environment of FIG. 1.

By way of example, FIG. 3 illustrates at 60 the execution of a generally checkpointing job in an HPC environment. Generally, such a job will first create a first checkpoint file (block 62) and perform some calculations (block 64). Then, to preserve the results of the calculations, a second checkpoint file is created (block 66), and once the second checkpoint file is created, the first checkpoint file may be deleted (block 68). In addition, in some instances, additional calculations may be performed (block 70), and as before, a third checkpoint file may be created (block 72) and the second checkpoint file then deleted (block 74).

Figure 4:
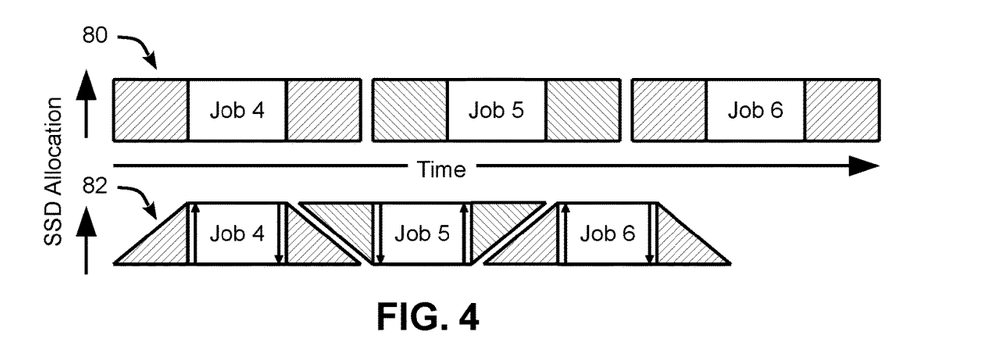
FIG. 4 is a block diagram illustrating burst buffer dynamic logical volume sizing in the high performance computing environment of FIG. 1.

With an architecture including a burst buffer data tier, the act of creating the first checkpoint file may be to stage in an existing file from permanent storage into the SSD. Similarly, the third checkpoint file would generally be staged out of the SSD to permanent storage. As illustrated at 80 in FIG. 4, in a storage constrained environment, one approach that could be taken would be for the job scheduler to wait until the required SSD space is available, and once that space is available, create a logical storage volume in the SSD sufficient to meet all of the job's storage requirements, stage in the input data for the job into the logical storage volume, and then start execution of the job. Then, once the job was complete, the SSD space could be released and the logical storage volume deleted, such that the SSD space was available for use by subsequent jobs. As illustrated in FIG. 4, therefore, some jobs may end up executing sequentially, with later jobs (e.g., jobs 5 and 6) having to wait until the SSD space was released the prior job (e.g., job 4 for job 5, and job 5 for job 6).

However, it has been found that the SSD space demands of a job in an HPC environment may change while the job is running. In many instances, the required SSD space is smallest at the beginning of the job, highest in the middle, and tapers off as the job completes. As but one example, in the checkpointing job of FIG. 3, initially only sufficient space for the first checkpoint file is required for the job. However, before the first checkpoint file can be deleted, the second checkpoint file must be created, and as such, the overall storage requirements for the job at this stage mandate sufficient storage for both checkpoint files.

Embodiments consistent with the invention, on the other hand, may be used to dynamically vary the size of a logical storage volume in a burst buffer or other storage on a computing node to better match the varying storage requirements of a job over its lifetime, and thus free up additional space for use by other jobs. In some instances, and as illustrated at 82 in FIG. 4, this may enable the staging of data for multiple jobs to and from the constrained space of an SSD or other non-volatile storage to be overlapped so that the overall system CPU/GPU utilization, and thus overall system performance is increased.

From one perspective, dynamical logical volume sizing may be implemented in connection with executing a job in a data processing system, and may include allocating a logical storage volume for the job in such computing node for each of a plurality of computing nodes in the data processing system, e.g., a cluster of computing nodes. The logical storage volume may be initially sized to meet initial stage in requirements for the job, such that, once the logical storage volume is allocated in each computing node, input data for the job may be prestaged into the logical storage volume in each computing node. Then, once the input data is prestaged, the allocation size of the logical storage volume in each computing node may be increased to meet the needs of the job during execution, such that once the allocation size has been increased, the job can execute on each computing node with the increased allocation size of the logical storage volume in each computing node.

It will be appreciated that in some instances, the logical storage volume may be resized multiple times during stage in and/or during execution based upon changing allocation needs of the job. Similarly, during stage out, the logical storage volume may also be resized one or more times, generally to reduce the size of the logical storage volume and thereby free up additional space for use by other jobs, e.g., to stage in data and/or execute in parallel with the stage out of the job. Moreover, it will be appreciated that in some instances, prestaging the input data for one job in the logical storage volume for that job prior to increasing the allocation size of the logical storage volume may enable the prestaging to occur concurrently with executing another job in the same computing node and using another logical storage volume, even when available storage in the computing node is insufficient to concurrently store the latter job's logical storage volume and the increased allocation size of the first logical storage volume.

In some embodiments, a job scheduler or workload manager, e.g., resident in a service node, may select computing nodes that satisfy the overall resource needs for a job. One of those resource needs is storage, although it will be appreciated that the storage may or may not be immediately available. Thus, to aid in resolving that storage need, the capabilities of the job scheduler may be extended in some embodiments using one or more scripts executed on the service node, e.g., a stage-in script to create and initiate data transfers into the SSD's for the computing nodes that were selected. The job scheduler may inform a stage-in script how much storage to allocate, and the stage-in script may also call a custom-written user script to identify any specific files that should be staged into the SSD prior to job execution. The user script may then initiate the transfer of those files into the SSD.

By using a scripting model, flexibility is provided to adjust to different user needs and allow dynamic metadata queries so that a user may not need to specify the data files (and target computing nodes) at job submission time. Such a solution also generally has minimal impact on the normal flow of the job scheduler, and in some instances, may allow for low jitter data transfers to avoid impacting the performance of running job(s). It will be appreciated that scripts may be interpreted code or may be implemented as executable binaries in some embodiments, while in other embodiments scripting may not be used, and the herein-described functionality may be implemented in various alternate manners understood in the art.

Figure 5:
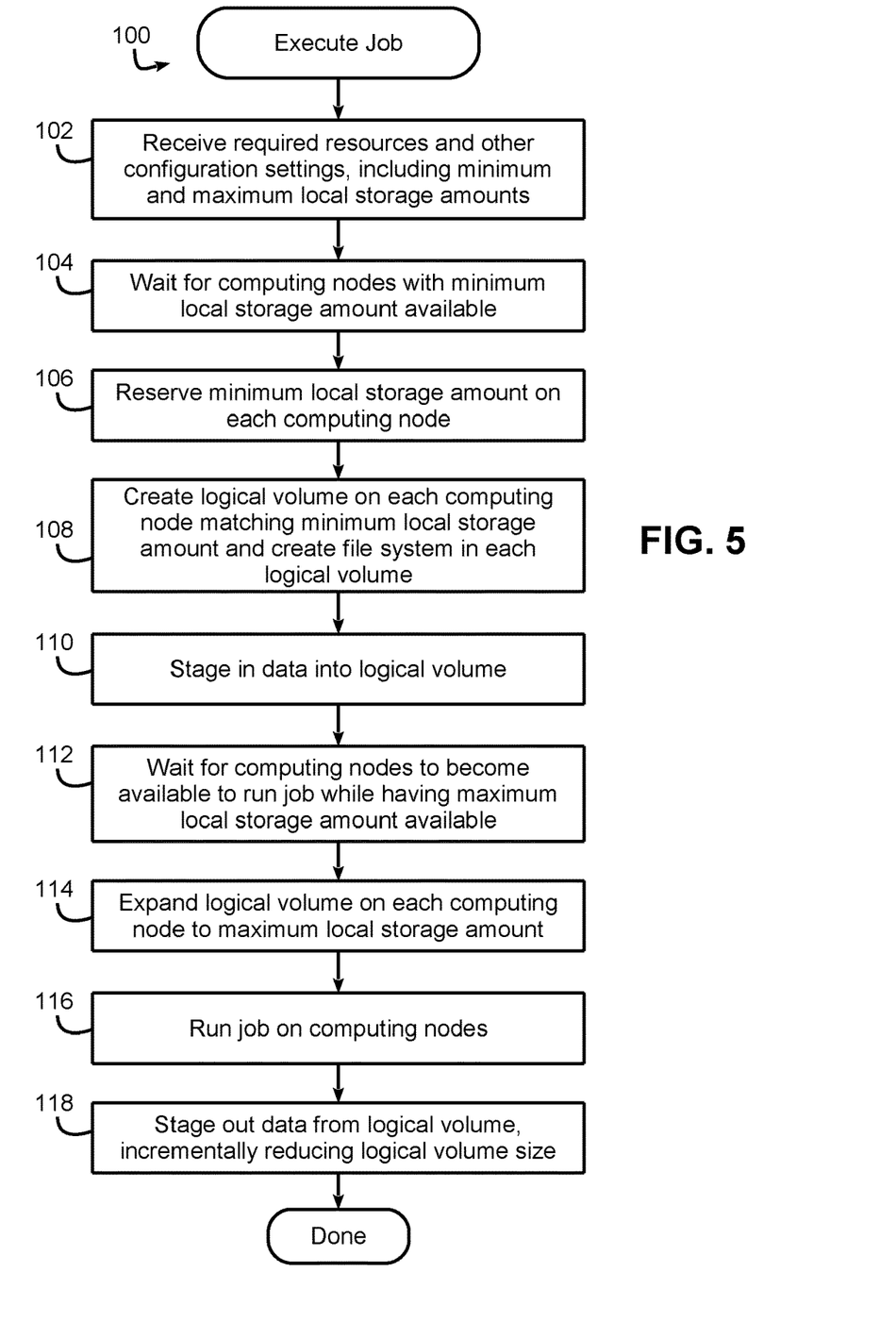
FIG. 5 is a flowchart illustrating an example sequence of operations for executing a job with burst buffer dynamic logical volume sizing in the high performance computing environment of FIG. 1.

Now turning to FIG. 5, this figure illustrates an example routine 100 for executing a job using a workload manager or job scheduler in data processing system 10. In block 102, the workload manager receives required resources and other configuration settings for the job, e.g., from a user job request. In the request, and among the required resources, is specified both a minimum local storage amount and a maximum local storage amount, with the former representing the local storage amount to be used during stage in and the latter representing the local storage amount to be used during execution of the job. In some embodiments, for example, a user may specify an initial allocation size to use for stage in and an increased allocation size to use for execution.

Next, in block 104, the workload manager waits for computing nodes having the minimum local storage amount available, and once suitable computing nodes are located, block 106 reserves the minimum local storage amount on each computing node. Block 108 then creates a logical storage volume on each computing node matching the minimum local storage amount, and creates a file system in each logical volume. Block 110 then stages in input data for the job into the logical storage volume, and block 112 waits for the computing nodes to become available to run the job while also having the maximum local storage amount specified in the job request available on the computing nodes. Once available, block 114 then expands the logical volume on each computing node to meet the maximum local storage amount specified in the job request, and block 116 runs (i.e., initiates execution of) the job on the computing nodes.

Next, upon completion of the job, block 118 stages out output data generated by the job from the logical storage volume. In some embodiments, the stage out may occur without a resizing of the logical storage volume. However, in other embodiments, and as illustrated in block 118, this staging out may occur incrementally, with the allocation size of the logical storage volume incrementally decreased after portions of the output data are staged out. Thereafter the logical storage volume may be deleted or destroyed, and execution of the job is complete.

Now turning to FIGS. 6-9, these figures illustrate another example embodiment for executing jobs using dynamic logical volume sizing in a data processing system such as data processing system 10. In this embodiment, scripts are used during stage in and/or stage out to assist in implementing dynamic logical volume sizing, although as noted above, scripts are not required in other embodiments. In addition, a job queue is also maintained to manage pending jobs prior to and during execution, although job queues are not required in other embodiments.

Figure 6:
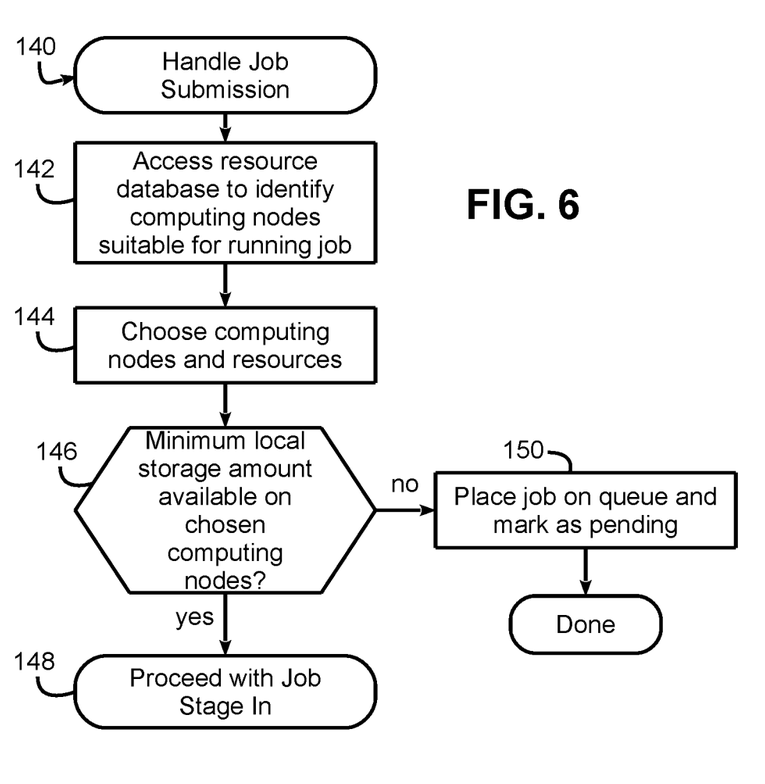
FIG. 6 is a flowchart illustrating an example sequence of operations for handling a job submission in the high performance computing environment of FIG. 1.

FIG. 6 illustrates a job submission or request handling routine 140 suitable for execution by a workload manager/job scheduler, and called in response to a job submission from a user. The job submission may specify, for example, various computing resource requirements such as the number and/or types of computing nodes desired, the executable program(s) to launch, the location to read input data, the location to write output data, and various parameters and/or environmental variables to use for the execution. In addition, the job submission may specify minimum and maximum local storage for each computing node, with the former used during stage in and the latter used during execution, similar to FIG. 5. Further, in this embodiment a user may also specify one or both of a user script to execute during stage in and a user script to execute during stage out.

Block 142 may access a resource database to obtain a list of resources in the data processing system, including, for example, available computing nodes and the current and total storage available on each computing node. Based upon this information, block 144 then chooses computing nodes and resources to use when executing the job. In this embodiment, the resources may include processors, which may be handled through job slots, as well as SSD's, which may be modeled as external resources.

Next, in block 146, a determination is made as to whether the minimum local storage amount for the job is available on all chosen computing nodes for the job. Current availability may be tracked in the resource database, e.g., by comparing logical volume(s) to the size of a volume group on each computing node), and in this embodiment, SSD oversubscription is not allowed.

If so, control passes to block 148 to proceed with stage in for the job. Otherwise, control passes to block 150 to place the job on a queue and mark the job as pending, so that the workload manager can later initiate stage in of the job once the minimum local storage amount becomes available and the job is otherwise ready to execute (as other jobs with higher priority may also be waiting to execute).

Figure 7:
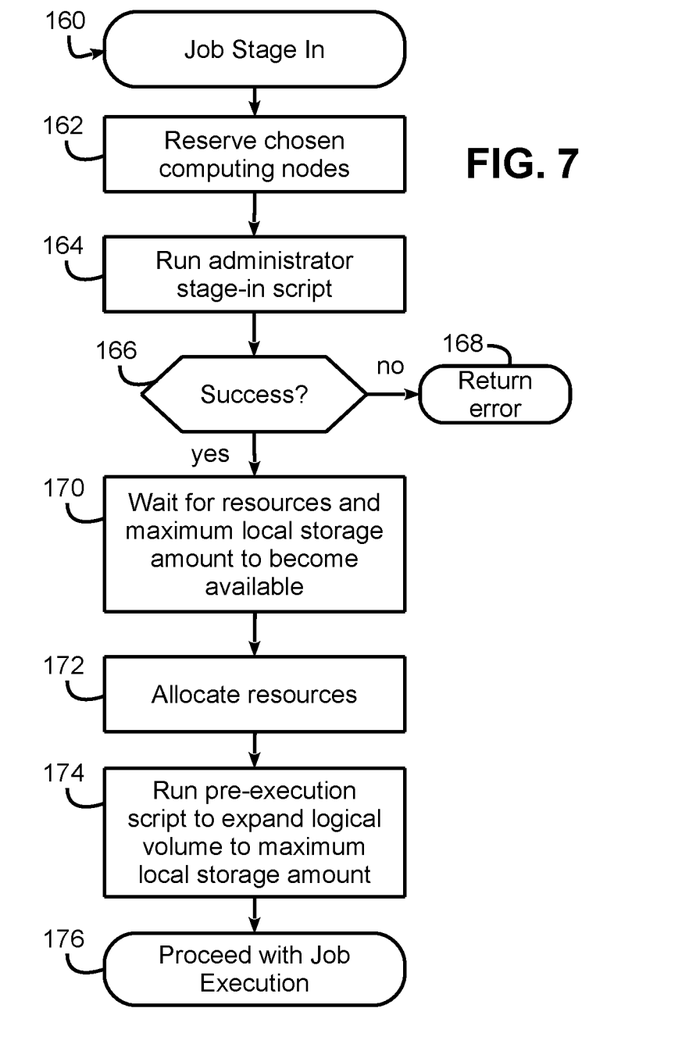
FIG. 7 is a flowchart illustrating an example sequence of operations for job stage in the high performance computing environment of FIG. 1.

FIG. 7 next illustrates a job stage in routine 160 suitable for execution by a workload manager/job scheduler. In block 162, the chosen computing nodes for the job are reserved, e.g., by creating a hardware reservation in the workload manager. In this embodiment, the hardware reservation is internal to the workload manager and locks the job to run on the chosen nodes but does not actually allocate those nodes at this time, such that other jobs may be running on the nodes during the stage in process for this job.

Next, in block 164 an administrator stage-in script in run by the workload manager to configure the local storage and initiate a transfer of the input data for the job, e.g., by creating a logical storage volume on each computing node of the allocation matching the specified minimum size, creating a file system (e.g., an XFS file system) within that logical storage volume, and initiating one or more transfers of input data into the logical storage volume.

Block 166 then determines whether execution of the administrator script was successful, and if not, returns an error (block 168). Otherwise, control passes to block 170 to wait for the chosen resources (e.g., computing nodes and/or processors), as well as the specified maximum local storage amount in each computing node, to become available. Once both conditions are met, block 172 next allocates those chosen resources, e.g., by atomically promoting the prior hardware reservation to an allocation, and block 174 runs a pre-execution script to increase or expand the size of the logical storage volume for each computing node to the specified maximum storage amount, e.g., by using a logical volume expansion function coupled with controlling the resident file system in the logical storage volume to expand its footprint. Then, in block 176, execution of the job is initiated in the chosen computing nodes, with the logical storage volume in each computing node dynamically resized to the maximum storage amount.

Figure 8:
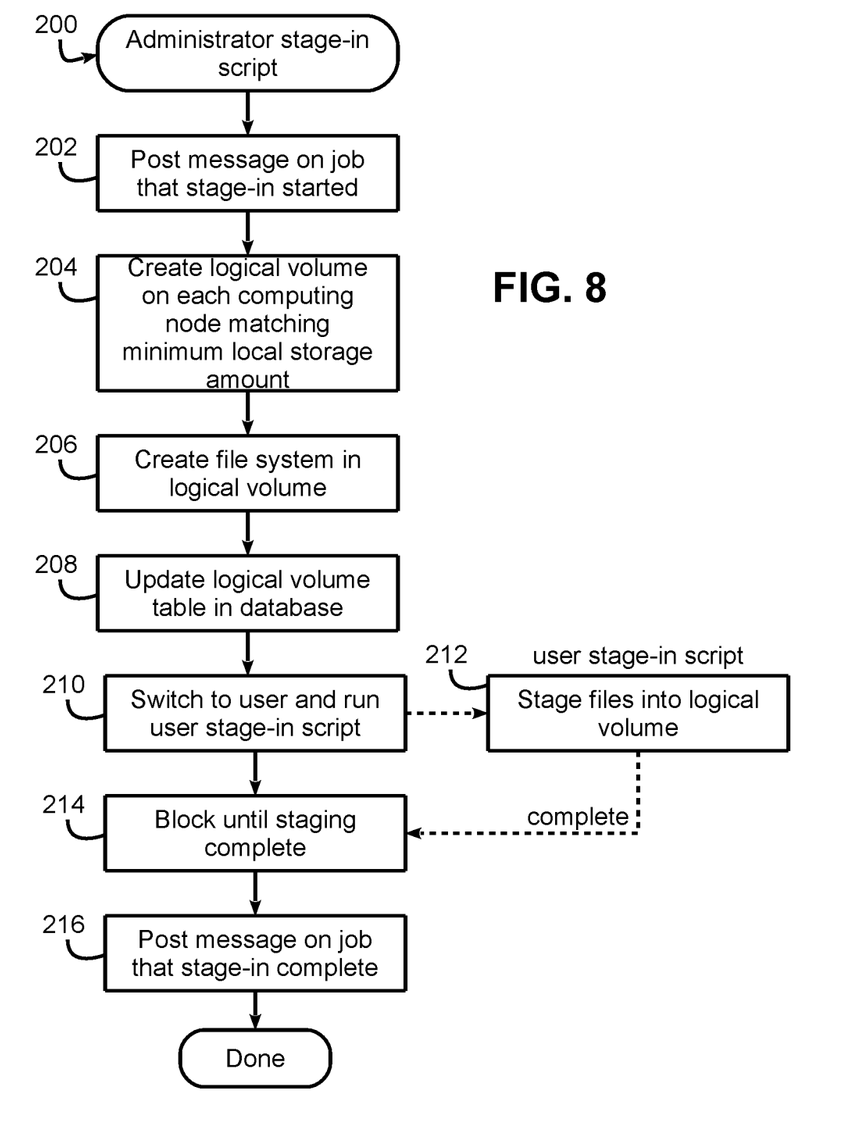
FIG. 8 is a flowchart illustrating an example sequence of operations for the administrator stage-in script referenced in FIG. 7.

FIG. 8 illustrates an example administrator stage-in script 200 that may be used in some embodiments. This script is generally executed on a service node by a workload manager or job scheduler, and begins in block 202 by posing a message on the job indicating that stage-in (or prestaging) has begun. Next, in block 204 the script creates a logical storage volume on each computing node, and having a size that matches the specified minimum local storage amount. Block 206 then creates a file system in the logical storage volume, and block 208 updates a logical volume table in the resource database to indicate that the logical storage volume has been created.

Next, in block 210, the administrator script switches to a user context and calls a user-specified stage-in script 212. The stage-in script 212 stages files into the logical storage volume, depending upon what files or other input data are needed by the job during execution. In some embodiments, the script may allow a user to examine metadata and determine which files they want to transfer to the computing nodes. In addition, in some embodiments, the administrator script and/or the user script may incrementally resize the logical storage volume such that as portions of the input data are written into the logical storage volume, the logical storage volume is incrementally increased in size to accommodate the additional input data.

As illustrated in block 214, the administrator stage-in script blocks until all staging has been completed, which occurs when the user stage-in script notifies the administrator stage-in script that it is complete. The administrator stage-in script may also monitor pending transfers to ensure that all such transfers initiated by the user stage-in script are complete. Once complete, the administrator stage-in script then notifies the workload manager, e.g., by posting a message on the job indicating that stage-in is complete.

Figure 9:
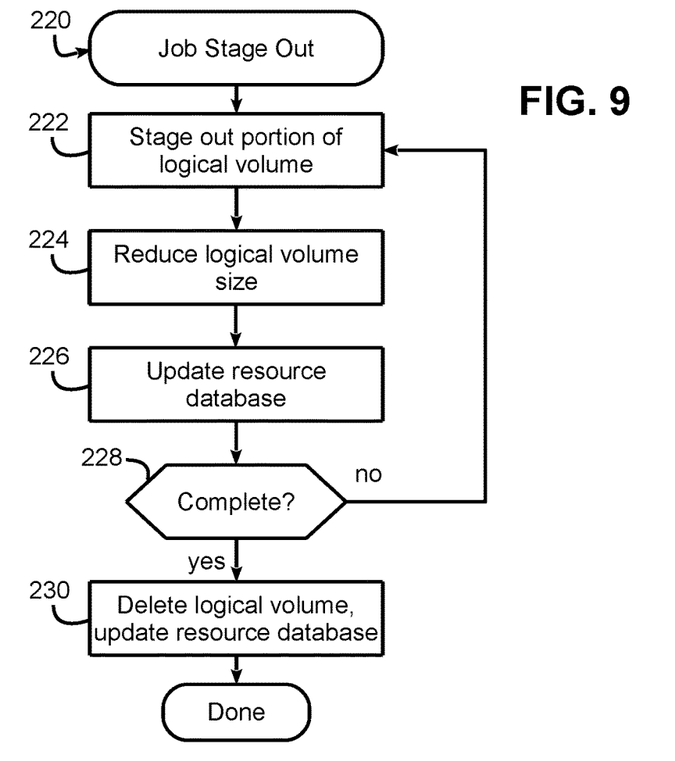
FIG. 9 is a flowchart illustrating an example sequence of operations for job stage out in the high performance computing environment of FIG. 1.

FIG. 9 next illustrates a job stage out routine 220 that may be executed by a workload manager or job scheduler, and in some embodiments, by a stage-out script executed thereby. As noted above, while stage out in some embodiments may not result in resizing of a logical storage volume prior to simply deleting the logical storage volume, routine 220 may be used in some embodiments to incrementally decrease the size of the logical storage volume during stage out. Thus, in block 222, a portion (e.g., one or more output files or data) of the logical storage volume is staged out, and in block 224 the logical storage volume size is reduced accordingly. In block 226, the resource database is updated to reflect the reduced size of the logical storage volume and thereby enable other jobs to potentially utilize the released storage space during the stage out process. Block 228 then determines if the stage out is complete, and if not, returns control to block 222 to stage out an additional portion of the logical storage volume. Once all output data has been staged out, the logical storage volume may be deleted and the resource database updated in block 230, and stage out of the job is complete.

Figure 10:
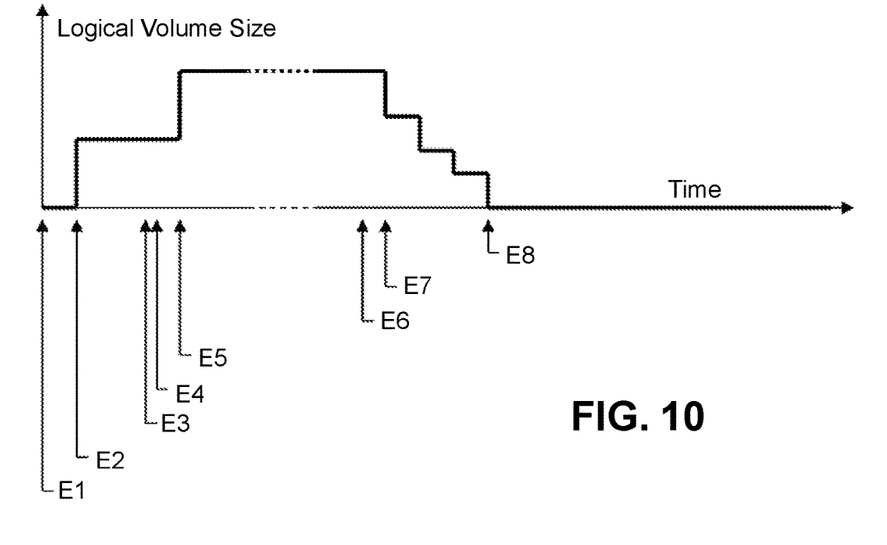
FIG. 10 is a graph illustrating changes in logical volume size during the life cycle of an example job executed in the high performance computing environment of FIG. 1.

As a further illustration of dynamic logical volume sizing, FIG. 10 illustrates the sizing of a logical storage volume over the lifecycle of an example job. It can be seen that at E1, the job is waiting for placement, and at E2, the job has been placed and the logical storage volume has been created using the specified minimum storage amount, and stage in has begun. At E3 stage in is complete, and the job awaits for additional SSD space to meet the specified maximum storage amount for the job. E4 represents the current job execution ending, and shortly thereafter at E5 the additional SSD space becoming available. At this time, the allocation of logical storage volume is increased to the maximum storage amount, and job execution begins. Then, at E6 the job execution ends, and stage out begins. At E7, transfers begin and the SSD logical volume size is incrementally reduced, until at E8 stage out ends and the SSD logical storage volume is destroyed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of executing a job in a data processing system, the method comprising:
   for each of a plurality of computing nodes in the data processing system, allocating a logical storage volume for the job in such computing node;
   after allocating the logical storage volume in each computing node, prestaging input data for the job in the logical storage volume in each computing node;
   after prestaging the input data for the job in the logical storage volume in each computing node, increasing an allocation size of the logical storage volume in each computing node; and
   after increasing the allocation size of the logical storage volume in each computing node, executing the job on each computing node such that the job executes with the increased allocation size of the logical storage volume in each computing node;
   wherein the job is a first job and the logical storage volume in a first computing node among the plurality of computing nodes is a first logical storage volume, and wherein prestaging the input data for the first job in the first computing node is performed concurrently with executing a second job in the first computing node using a second logical storage volume in the first computing node when available storage in the first computing node is insufficient to concurrently store the second logical storage volume and the increased allocation size of the first logical storage volume.

2. The method of claim 1, wherein each computing node includes at least one processor, a volatile memory and a solid-state drive (SSD) storage device, and wherein the data processing system further includes:
   a storage system including a plurality of storage nodes interconnected with the plurality of computing nodes; and
   a burst buffer data tier using the SSD storage device in each computing node, the burst buffer data tier including cooperative burst buffer components resident in each computing node among the plurality of computing nodes and each storage node among the plurality of storage nodes.

3. The method of claim 2, wherein prestaging the input data includes transferring data from the storage system to the SSD of each computing node.

4. The method of claim 1, wherein the data processing system further includes at least one service node, and wherein allocating the logical storage volume, prestaging the input data and increasing the allocation size are initiated by a workload manager resident in the at least one service node.

5. The method of claim 4, wherein allocating the logical storage volume and prestaging the input data are performed prior to availability of the increased allocation size of the logical storage volume in each computing node.

6. The method of claim 4, wherein the job is a checkpointing job that sequentially performs first calculations subsequent to creation of a first checkpoint file, creates a second checkpoint file, deletes the first checkpoint file, performs second calculations, creates a third checkpoint file, and deletes the second checkpoint file, and wherein prestaging the input data includes prestaging the first checkpoint file.

7. The method of claim 4, wherein allocating the logical storage volume and prestaging the input data are performed using one or more scripts initiated by the workload manager.

8. The method of claim 7, wherein the one or more scripts includes an administrator script configured to create the logical storage volume and a user script called by the administrator script to prestage one or more files when prestaging the input data.

9. The method of claim 8, wherein the administrator script is further configured to monitor pending transfers during prestaging of the input data and notify the workload manager once pending transfers are complete.

10. The method of claim 8, further comprising, in the workload manager, determining when the increased allocation size is available on each computing node and initiating a pre-execution script to increase the allocation size of the logical storage volume in each computing node.

11. The method of claim 4, wherein allocating the logical storage volume is performed in response to a job request received by the workload manager and specifying computing resources for the job, the specified computing resources including an initial allocation size and the increased allocation size for the logical storage volume in each computing node.

12. The method of claim 11, wherein the job request further specifies one or more user scripts to initiate during stage-in and/or stage-out of the job.

13. The method of claim 11, further comprising:
   in response to unavailability of the increased allocation size in each computing node, creating a hardware reservation for the job to run on the plurality of computing nodes; and
   after allocating the logical storage volume and prestaging the input data, promoting the hardware reservation to a hardware allocation once the specified computing resources and the increased allocation size for the logical storage volume are available in each computing node.

14. The method of claim 1, further comprising, after executing the job, staging out output data from the logical storage volume in each computing node to a storage system.

15. The method of claim 14, wherein staging out the output data is performed by a workload manager resident on a service node of the data processing system and using one or more scripts initiated by the workload manager.

16. The method of claim 14, wherein staging out the output data includes incrementally staging out portions of the output data and decreasing the allocation size of the logical storage volume in each computing node.

17. The method of claim 16, further comprising:
   maintaining in the data processing system a database of available storage in each computing node;

updating the database in response to changes in the allocation size in the logical storage volume in each computing node;

accessing the database to determine whether to prestage or execute a second job based upon available storage in each computing node; and destroying the logical storage volume in each computing node after staging out the output data.

18. A data processing system, comprising:

a plurality of computing nodes; and program code configured upon execution by at least one processor to execute a job on the plurality of computing nodes by:

for each of the plurality of computing nodes, allocating a logical storage volume for the job in such computing node;

after allocating the logical storage volume in each computing node, prestaging input data for the job in the logical storage volume in each computing node;

after prestaging the input data for the job in the logical storage volume in each computing node, increasing an allocation size of the logical storage volume in each computing node; and after increasing the allocation size of the logical storage volume in each computing node, executing the job on each computing node such that the job executes with the increased allocation size of the logical storage volume in each computing node;

wherein the job is a first job and the logical storage volume in a first computing node among the plurality of computing nodes is a first logical storage volume, and wherein prestaging the input data for the first job in the first computing node is performed concurrently with executing a second job in the first computing node using a second logical storage volume in the first computing node when available storage in the first computing node is insufficient to concurrently store the second logical storage volume and the increased allocation size of the first logical storage volume.

19. A program product, comprising:

a non-transitory computer readable medium; and program code stored on the non-transitory computer readable medium and configured upon execution by at least one processor to execute a job in a data processing system of a type including a plurality of computing nodes by:

for each of the plurality of computing nodes in the data processing system, allocating a logical storage volume for the job in such computing node;

after allocating the logical storage volume in each computing node, prestaging input data for the job in the logical storage volume in each computing node;

after prestaging the input data for the job in the logical storage volume in each computing node, increasing an allocation size of the logical storage volume in each computing node; and after increasing the allocation size of the logical storage volume in each computing node, executing the job on each computing node such that the job executes with the increased allocation size of the logical storage volume in each computing node;

wherein the job is a first job and the logical storage volume in a first computing node among the plurality of computing nodes is a first logical storage volume, and wherein prestaging the input data for the first job in the first computing node is performed concurrently with executing a second job in the first computing node using a second logical storage volume in the first computing node when available storage in the first computing node is insufficient to concurrently store the second logical storage volume and the increased allocation size of the first logical storage volume.

* * * * *